United States Patent
Jacobowitz et al.

(10) Patent No.: US 6,801,693 B1
(45) Date of Patent: Oct. 5, 2004

(54) OPTICAL BACKPLANE ARRAY CONNECTOR

(75) Inventors: Lawrence Jacobowitz, Wappingers Falls, NY (US); Christoph Berger, Horgen (CH); Cameron J. Brooks, Elmsford, NY (US); Casimer M. DeCusatis, Poughkeepsie, NY (US); Phillip G. Emma, Danbury, CT (US); John U. Knickerbocker, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/272,694

(22) Filed: Oct. 16, 2002

(51) Int. Cl.[7] ............................. G02B 6/26; G02B 6/42
(52) U.S. Cl. ............................. 385/50; 385/14; 385/39; 385/49; 385/52; 385/88; 385/90
(58) Field of Search ............................. 385/14, 39, 49, 385/50, 52, 88–90, 129, 131

(56) References Cited

U.S. PATENT DOCUMENTS

| | | | |
|---|---|---|---|
| 4,863,232 A * | 9/1989 | Kwa ............................. | 385/89 |
| 4,890,894 A | 1/1990 | Kwa ............................. | 385/56 |
| 5,204,925 A | 4/1993 | Bonanni et al. ............... | 385/89 |
| 5,488,682 A * | 1/1996 | Sauter et al. .................. | 385/53 |
| 5,671,316 A | 9/1997 | Yuhara et al. ................ | 385/137 |
| 5,784,509 A | 7/1998 | Yamane et al. ................ | 385/49 |
| 5,793,919 A | 8/1998 | Payne et al. .................. | 385/135 |
| 6,005,991 A | 12/1999 | Knasel ........................... | 385/14 |
| 6,069,991 A * | 5/2000 | Hibbs-Brenner et al. ..... | 385/50 |
| 6,229,942 B1 | 5/2001 | Engberg et al. ................ | 385/39 |
| 6,272,271 B1 | 8/2001 | Wojnarowski et al. ........ | 385/52 |
| 6,282,352 B1 | 8/2001 | Kato et al. ..................... | 385/92 |
| 6,304,690 B1 | 10/2001 | Day ................................ | 385/24 |
| 6,390,690 B1 * | 5/2002 | Meis et al. ..................... | 385/88 |
| 6,427,034 B1 * | 7/2002 | Meis et al. ..................... | 385/14 |
| 6,474,860 B2 * | 11/2002 | Wojnarowski et al. ....... | 362/555 |
| 6,588,943 B1 * | 7/2003 | Howard ......................... | 385/88 |
| 2003/0002801 A1 * | 1/2003 | Vegny et al. .................. | 385/52 |

* cited by examiner

*Primary Examiner*—Akm Enayet Ullah
*Assistant Examiner*—Daniel Petkovsek
(74) *Attorney, Agent, or Firm*—James J. Cioffi

(57) ABSTRACT

An apparatus and method for forming a staircase arrangement for the connection of optical waveguides between a card and backplane. A card having optical waveguides and electrical conductors embedded in the card has an edge ending in a staircase arrangement with optical fiber-ribbons protruding from the edge. A guidance structure is connected to the edge and contains channels to guide and align the optical fiber-ribbons. A backplane having embedded optical waveguides and electrical conductors also has an edge ending in a staircase arrangement with a guidance stricture connected to the edge and tapered openings which receive and guide the optical fiber-ribbons into close proximity with the optical waveguides and forming a staircase arrangement of connected waveguides between a card and backplane.

26 Claims, 7 Drawing Sheets

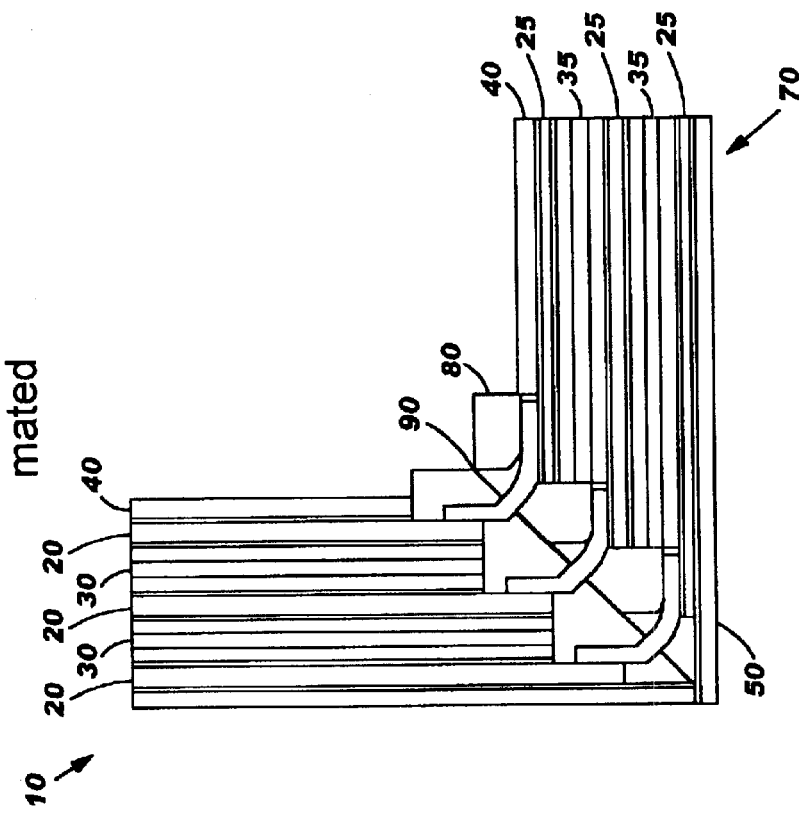
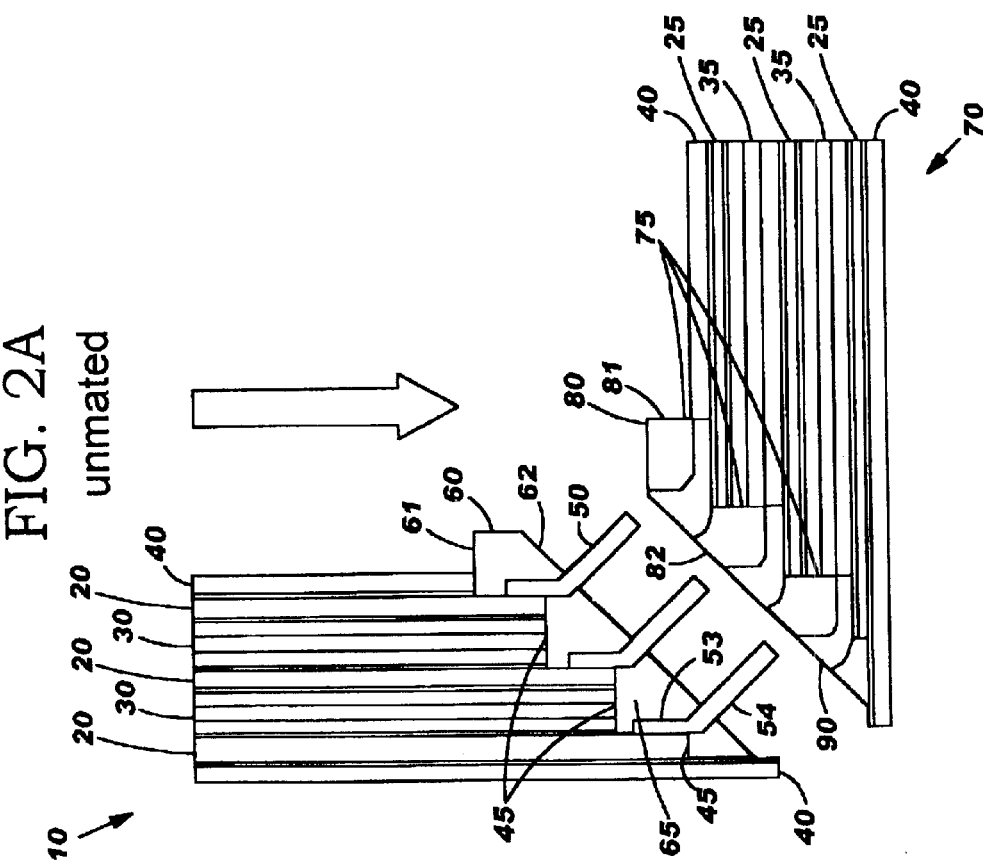

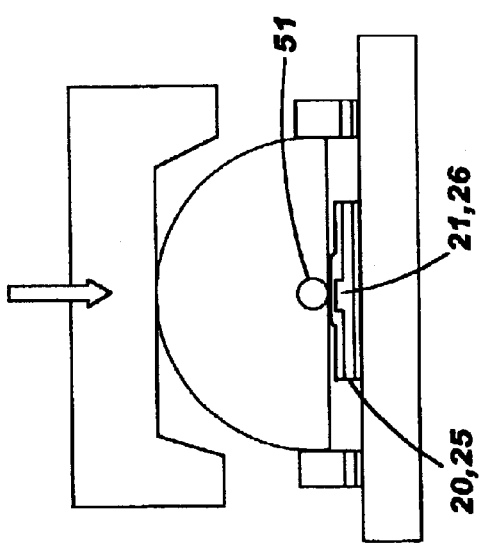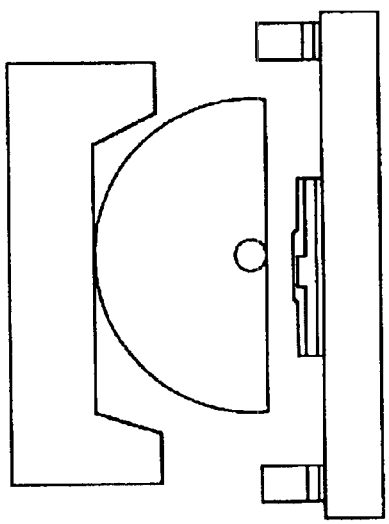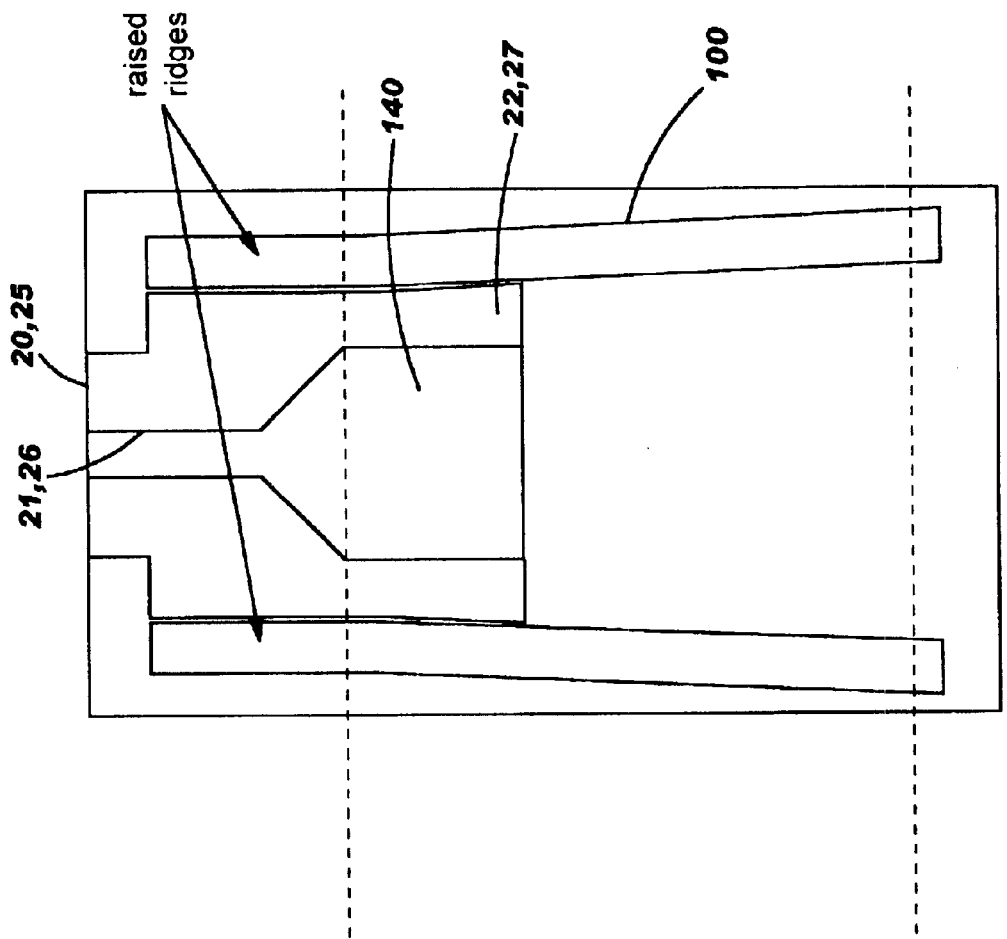

OPTICAL BACKPLANE ARRAY CONNECTOR

BACKGROUND OF THE INVENTION

This invention relates generally to optical interfaces for data communication and, more particularly, to optical interfaces with improved alignment capability.

Optical data communications technology has a number of advantages over wire technology, such as bandwidth, data rate and response characteristics superior to those of conventional wire technology. Also, optical technology is essentially immune to radio frequency interference (RFI) and electromagnetic interference (EMI) issues associated with wire technology. Optical data communication is therefore desirable in a variety of applications such as multi-chip modules (MCMs), printed circuit board (PCB) technologies, and integrated backplanes.

In conventional optical connectors, electronic circuitry, optical source and optical detectors are typically mounted on PCBs which are received in card guides mounted to an equipment frame. A backplane mounted to the rear of the frame includes board edge connectors aligned with the card guides and electrical conductors interconnecting the board edge connectors. The circuit boards are provided with board edge electrical contacts which are received in the board edge connectors when the circuit hoards are slidably inserted in the card guides to electrically connect the circuitry to the electrical conductors on the back plane. The electrical conductors provide the required electrical connections between circuit board.

The circuit boards also include optical connector parts which are optically coupled to the optical sources and to the optical detectors of the receivers and transmitters. The board mounted optical connector parts must be mated with frame mounted optical connector parts to optically connect the optical sources and the optical detectors to optical fibers terminating on the frame mounted optical connectors.

In the current board edge optical connector arrangements the circuit board mounted optical connector parts are mounted at leading edges of the circuit boards. These leading edges are already congested with board edge electrical contacts. In addition, in the board edge optical connector arrangements the frame mounted optical connector parts are mounted at the back plane which is already congested with electrical board edge connectors and electrical conductors. In current systems, optical fibers are left to hang loose between packs or bundles of fibers which tends to create a "rat's nest" of fibers.

In view of these problems it is a purpose of the present invention to provide an apparatus and method to connect large numbers of optical fibers to an optical backplane and avoid the "rats nest" problem associated with multiple fiber-to-fiber connections and/or routing systems.

It is another purpose of the present invention to provide an improved optical interface between a mother board and a daughter card (or backplane) involving 90 degree turns and pluggable connections.

It is another purpose of the present invention to provide arrays of interconnects utilizing waveguides and fibers.

These and other purposes of the present invention will become more apparent after referring to the following description considered in conjunction with the accompanying drawings.

BRIEF SUMMARY OF THE INVENTION

The purposes and advantages of the present invention have been achieved by providing an apparatus for forming a staircase arrangement for the connection of optical waveguides between a card and backplane comprising:

a card having first optical waveguides, the first optical waveguides having a low index of refraction region surrounding a high index of refraction core region;

electrical conductors embedded in the card, and where the card has a first edge ending in a staircase arrangement;

optical fiber-ribbons having a low index of refraction region surrounding a high index of refraction core region and having one end in close proximity with the first optical waveguides, the optical fiber-ribbons protruding from the first edge;

a first guidance structure connected to the first edge and the first guidance structure containing channels to guide and align the optical fiber-ribbons, and having a first inner side comprising a staircase arrangement and a first outer side having an inclination;

a backplane having second optical waveguides, the second optical waveguides having a low index of refraction region surrounding a high index of refraction core region;

additional electrical conductors embedded in the backplane, and the backplane having a second edge ending in a second staircase arrangement; and a second guidance structure connected to the second edge, the second guidance structure having a second inner side comprising a staircase arrangement and a second outer side having an inclination and tapered openings which receive and guide a second end of the optical fiber-ribbons into close proximity with the second optical waveguides when the outer side of the first guidance structure is brought into contact with the outer side of the second guidance structure, thereby forming a staircase arrangement of connected waveguides between a card and backplane.

The fiber-ribbons may have a D-shaped cross section such that the high index of refraction core region is in close proximity to a flat edge of the D-shaped cross section and the flat edge is in close proximity to the first and second optical waveguides. This close proximity is necessary for efficient core to core coupling. The fiber-ribbons may be a multimode high refractive index polymer optical fibers with bend radii of approximately 1 mm.

The apparatus may also have grating structures formed in the low index of refraction region of the first or second optical waveguides or in the core regions of either the waveguide or fiber ribbon to enable grating-assisted coupling.

It is another object of the invention to provide a method for forming a connection of optical waveguides between a card and backplane comprising the steps of:

providing a card having first optical waveguides, said first optical waveguides having a low index of refraction region surrounding a high index of refraction core region;

forming a first edge in the card ending in a first staircase arrangement;

providing fiber-ribbons having a low index of refraction region surrounding a high index of refraction core region and having a first end in close proximity with the first optical waveguides, the fiber-ribbons protruding from the first edge;

connecting a first guidance structure to the first edge, the first guidance structure containing channels to guide and align the fiber-ribbons and having a first inner side comprising a staircase arrangement and a second outer side having an inclination;

providing a backplane having second optical waveguides, the second optical waveguides having a low index of refraction region surrounding a high index of refraction core region;

forming a second edge ending in a second staircase arrangement;

connecting a second guidance structure to the second edge, the second guidance structure having a second inner side comprising a staircase arrangement and a second outer side having an inclination and tapered openings;

inserting a second end of the fiber-ribbons into the tapered openings which receive and guide the second end of fiber-ribbons; and placing the outer side of the first guidance structure into contact with the outer side of the second guidance structure thereby placing the fiber-ribbons into close proximity with the second optical waveguides and forming a staircase arrangement to connected waveguides between a card and backplane.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

FIG. 2a is a schematic view of an unmated arrangement for connecting multiple layers of embedded waveguides.

FIG. 2b is a schematic view of a mated arrangement for connecting multiple layers of embedded waveguides.

FIG. 5a is a cross sectional view of a tapered structure for fiber to waveguide alignment.

FIG. 5b is a cross sectional view of a tapered structure for fiber to waveguide alignment.

FIG. 5c is a top view of a tapered structure for fiber to waveguide alignment including flairs to provide mode-conversion.

DETAILED DESCRIPTION OF THE INVENTION

The purposes of the present invention have been achieved by providing an apparatus and method to connect large numbers of optical fibers to an optical backplane, preferably, forming an orthogonal connection of optical waveguides between a card and backplane. While the following description is directed to an orthogonal connection, the present invention is not limited to an orthogonal connection. The present invention could easily be configured to connect a card and backplane at any desired angle.

Figure 1:
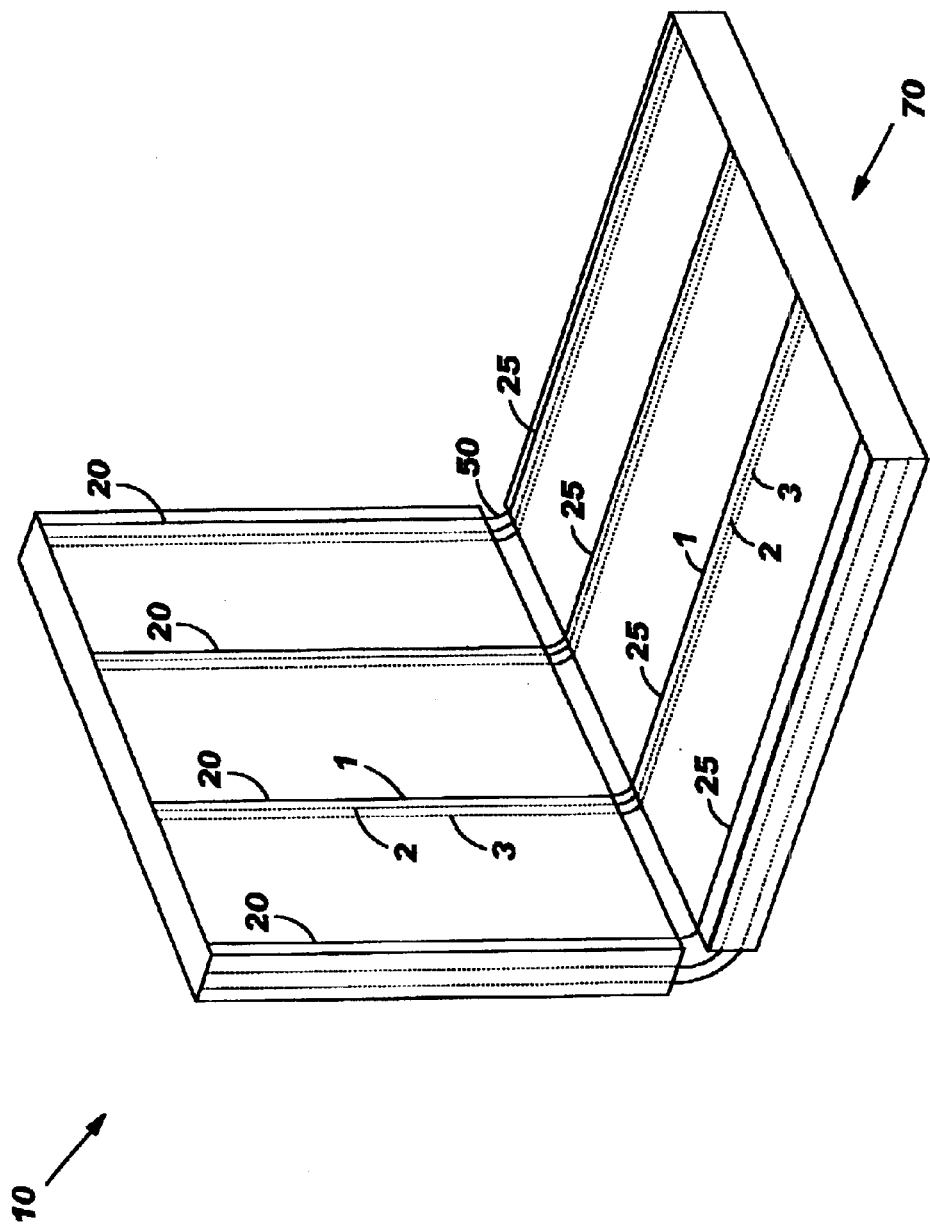
FIG. 1 is an isometric view of the apparatus showing the arrayed, orthogonal interconnection system.

Referring to FIG. 1 there is shown a first embodiment of the present invention comprising a structure for the orthogonal connection of multiple layers of embedded waveguides between a card 10 and backplane 70. This embodiment allows one to extend from a single waveguide layer on the surface of a board to multiple layers of waveguides embedded in the board. Parallel planar arrays of embedded waveguides 20, 25 are formed in the laminate structure or card 10 and backplane 70 respectively. The waveguides 20, 25 are optically coupled from the card 10 to the backplane 70 by optical fiber-ribbons 50. As will be illustrated in more detail in the subsequent drawings, the fiber-ribbons 50 make a 90 degree bend as they exit the card 10 and enter the backplane 70. In the description that follows the term "fiber-ribbon" may refer to either an individual optical fiber or an array of optical fibers.

In the particular example illustrated in FIG. 1 there is shown an array of 4 parallel periodically-spaced waveguides 20 which are formed in 3 layers 1, 2, 3 on the card 10 and backplane 70 to comprise a 12-way optical connection system. It will he apparent to one skilled in the art that this embodiment is readily extendable more complex examples of N arrays of parallel periodically-spaced waveguides formed in M layers to form a N×M way optical connection system.

Referring to FIG. 2A there is shown a cross-sectional view of the card 10 and backplane 70, prior to connection, with three layers of first optical waveguides 20 and two layers of first electrical conductors 30 embedded in the board material 40, in this example FR4. An alternative embodiment (not shown) would be to provide contiguous layers of optical waveguides and electrical conductors on the surface of the card or backplane.

The card 10 has a first edge 45 which ends in a first staircase arrangement. As shown in the figure this "staircase arrangement" is a series of steps formed by the successive layers of the optical waveguides 20 and electrical conductors 30 having increased vertical length. Such a "staircase" can be formed mechanically or chemically, or may be fabricated as part of the board design.(ie, included in the layout of the board).

Similarly, the backplane 70 has a second edge 75 which ends in a second staircase arrangement where a series of steps are formed by the successive layers of the optical waveguides 25 and electrical conductors 35 having increased horizontal length.

A first end 53 of the fiber-ribbon 50 is permanently attached to the first optical waveguides 20. To minimize losses due to bend radius optical leakage, it may be necessary for these fiber pieces to be selected from the group consisting of multi-mode high refractive index polymer optical fibers with bend radii on the order of 1 mm. A commercially available example is provided by Paradigm Optics' MMPOF5A. This attachment can be done using established techniques such as thermal fusion splicing or refractive index matched, UV-cured epoxies. Conventional active alignment techniques can also be used during the attachment process to maximize coupling efficiency (active alignment).

A first guidance structure 60 is permanently attached to the first edge 45. The guidance structure 60 contains channels 65 to guide and align the optical fiber-ribbons 50. The first guidance structure 60 has a first inner side 61 forming a staircase arrangement and a first outer side 62 having an inclination of approximately 45 degrees. In a more general case either inclination could be more or less than 45 degrees.

The backplane 70 is prepared accordingly, but without the fiber-ribbons 50 and with a second connector 80 attached to the staircase. The second connector 80 has a second inner side 81 forming a staircase arrangement and a second outer side 82 having an inclination of approximately 45 degrees. Again, in a more general case either inclination could be more or less than 45 degrees.

The second connector 80 may also have funnel-shaped openings 90 to facilitate insertion and guidance of a second end of the fiber-ribbon 54 during mating. Alternatively, the protruding fiber-ribbons 50 can extend from the second connector 80 such that the protruding fiber-ribbons 50, as well as a conventional dust and eye protection complex, are on the backplane 70. In addition to this possible exchange of male and female, other variations like single-layer to multi-layer, etc., are possible.

Referring now to FIG. 2B the alignment of the fiber-ribbons 50 coming from the card with respect to the waveguides 20 in the backplane 70 is done in three stages. The first stage (not shown in the figure) is the coarse mechanical guidance of the card 10 with respect to the backplane 70. This guidance consists of the mechanics that holds the card 10 in the shelf and the electrical connections (power, ground, etc.). The second stage utilizes the funnels 90 in the female optical connector 80. They guide the fiber-ribbons 50 very close to the optical waveguides 25. The final stage, shown in FIG. 2B and discussed with reference to the figures that follow, consist of a guidance structure on the board which is defined during board fabrication (e.g. in the waveguide layer) and which is therefore positioned with high precision.

Figure 3C:
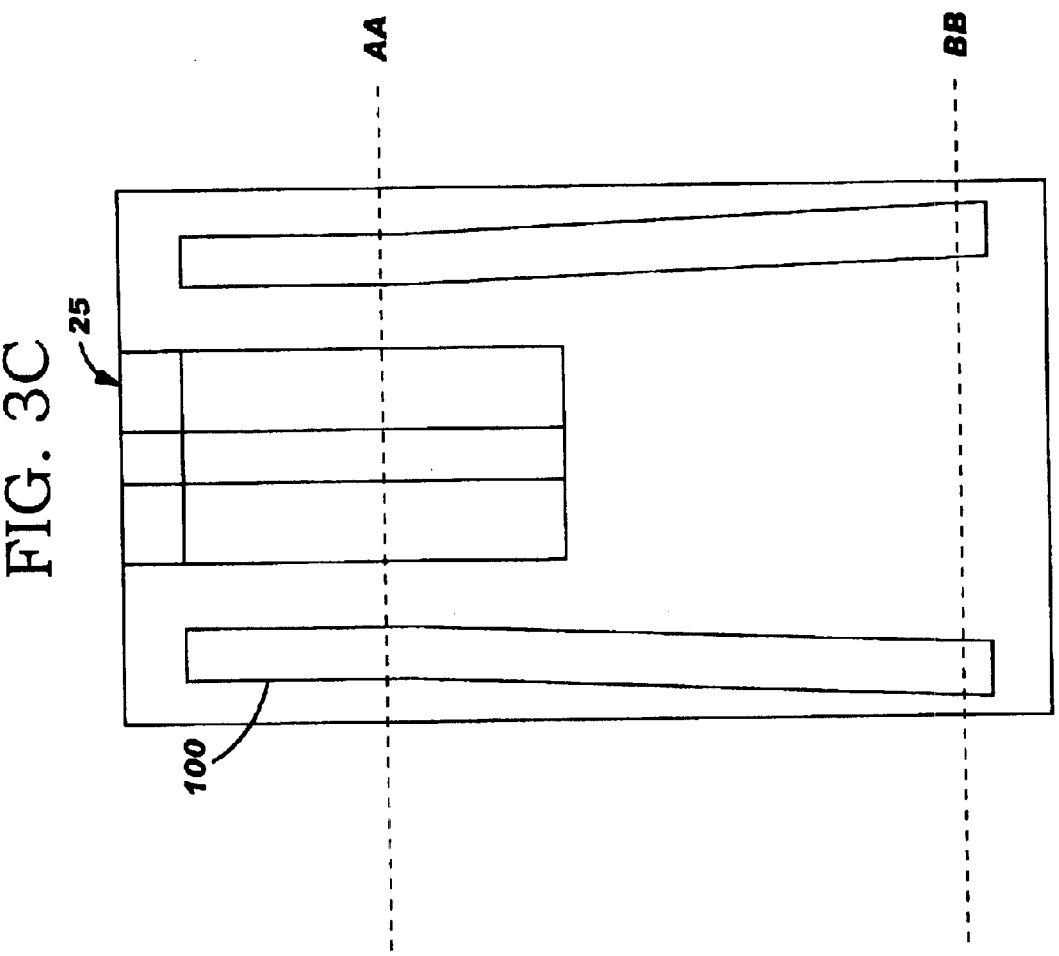
FIG. 3c is a top view of a structure for fiber to waveguide alignment including funnels to physically guide the fiber core over the waveguide core.
Figure 3A:
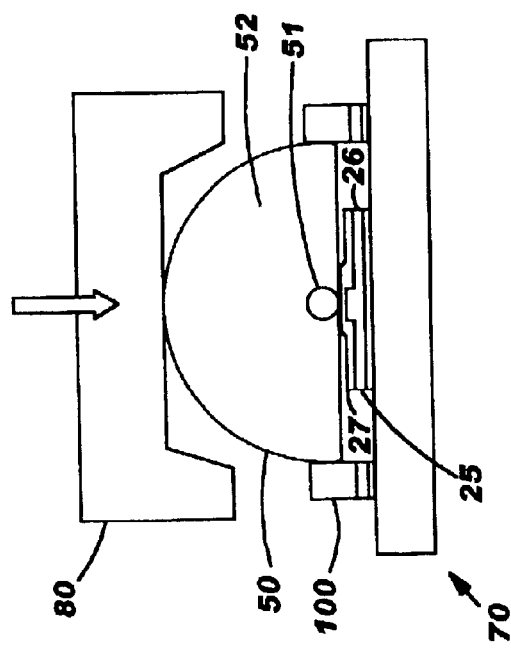
FIG. 3a is a cross sectional view of a structure for fiber to waveguide alignment.
Figure 3B:
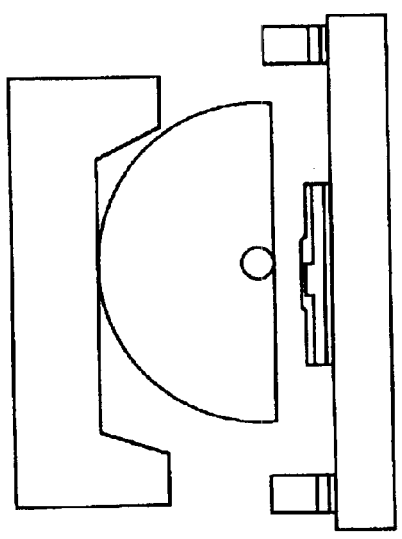
FIG. 3b is a cross sectional view of a structure for fiber to waveguide alignment.

Referring to FIG. 3A, in another aspect of the present invention, the same process that is used to define the optical waveguides 20, 25 or, alternatively, the electrical connections 30, 35, is used to define a third guidance structure 100 directly on the backplane 70. This third guidance structure 100 facilitates the fin e alignment of the fiber-ribbon 50 that is to be coupled to the waveguide 25. FIG. 3C is a top view showing the third guidance structure 100 and optical waveguide 25 prior to the insertion of the fiber-ribbon 50. The advantage of this approach is that the position of the third guidance structure 100 relative to the optical waveguide 25 is controlled by the precision of the board manufacturing process which fabricated the optical waveguide 25.

Figure 4:
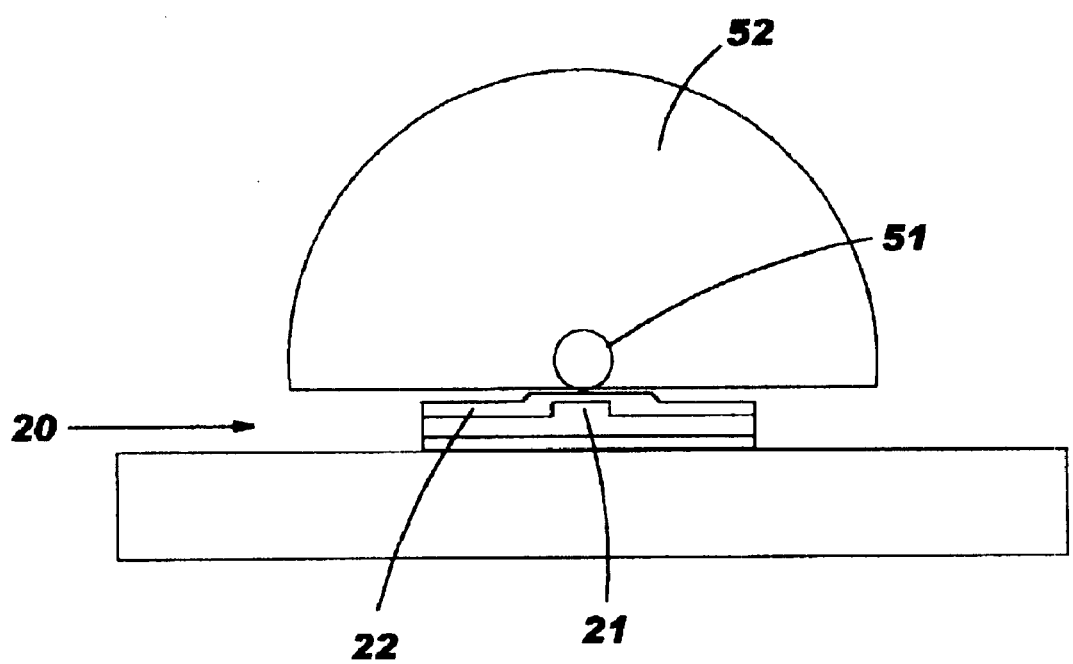
FIG. 4 is a cross sectional view of fiber core to waveguide core alignment.

As illustrated in FIG. 3A the second optical waveguides 25 consist of a low index of refraction region 27 surrounding a high index of refraction core region 26. Similarly, referring to FIG. 4 the first (card) optical waveguide 20 consists of a low index of refraction region 22 surrounding a high index of refraction core region 21. The fiber-ribbons 50 also consist of a low index of refraction region 52 surrounding a high index of refraction core region 51. The core region 51 of the fiber must be accessible and in close alignment with the core region 26 to optimize optical coupling.

Referring again to FIG. 3C there is shown a cross section at two positions, AA and BB, of one waveguide 25 with third guidance structure 100 fabricated in a funnel shape. A fiber-ribbon 50, is inserted from below into the alignment funnel 100. In a preferred embodiment the alignment funnel is formed by the same material that also forms the optical waveguide thereby achieving the discussed manufacturing efficiency.

Referring again to FIG. 3A, in a preferred embodiment the fiber-ribbon 50 is fabricated in a "D-shaped" geometry such that the high index of refraction core region 51 is in close proximity to a flat edge of the D-shaped cross-section to provide close alignment proximity between the fiber-ribbon core 51 and the optical waveguide core 26. This close alignment proximity is necessary for efficient core to core coupling.

The coarse guidance is provided by the second connector 80. In a preferred embodiment the second connector 80 has the shape of a guidance groove. In this example, the coarse guidance is provided by a V-groove like guidance, which can be part of the connector structure, as already mentioned above. A fair amount of pressure is required to get good coupling so mechanical force is applied to press the fiber-ribbon 50 to the optical waveguide 25. The mechanical force is applied via the connector after the fiber-ribbon 50 is in place. If the mechanical force were applied with the second connector guidance groove 80 alone it would probably cause damage to the waveguide and produce scratching debris that would eventually inhibit good coupling.

In addition, polymers can be molded to form "self-aligning" structures, the key point being that polymer cores can range from 8 urn and higher. Referring now to FIG. 5A there is shown a preferred embodiment where the high index of refraction core region 21, 26 of the first and second optical waveguides 20, 25 are used to provide mode-conversion when coupling significantly dissimilar fiber to waveguide core diameters and indices, for example, polymer core to silica core. Referring to FIG. 5C, in this case the high index of refraction core regions 21, 26 have a flared geometry 140 to enhance alignment between the waveguide core region 21, 26 and the fiber-ribbon core region 51.

The method for optical coupling between the optical waveguides and fiber cores in this invention is through close proximity or "evanescent" mode transfer. This transfer is dependent on both the optical waveguide core separation and the critical "coupling length". As illustrated in FIGS. 2A and 3A the two cores 26 ,51 need to be brought into close proximity and co-linear to enable efficient optical coupling. The co-linear constraints are provided for by the second guidance structure 80 and third guidance structure 100. The D-shaped cross section of the fiber-ribbon 50 enables the two cores to be brought into close proximity.

The joining of the fiber-ribbon 50 with the optical waveguide 20 on the card 10 is formed by any of the attachment techniques such as epoxy, fusion-splicing or other. This is a "permanent" connection. The connection between the backplane 70 and the fiber-ribbon 50 is not permanent but rather pluggable with the alignment structures described above.

The efficiency of close proximity or evanescent optical coupling between two dissimilar waveguides is increased by a periodic refractive index perturbation in the coupling region (see reference: *Optical Integrated Circuits* by H. Nishihara, M. Haruna, T. Suhara, 1989, McGraw-Hill Optical and Electro-Optical Engineering Series, p. 63). This perturbation is created using a Bragg grating structure that can be realized through a modulation of the refractive index along the characteristic coupling length. The physical theory of grating assisted couplers can be found in the reference (Nishihara). There are various possible alternative configurations to realize this "grating coupler".

Figure 6:
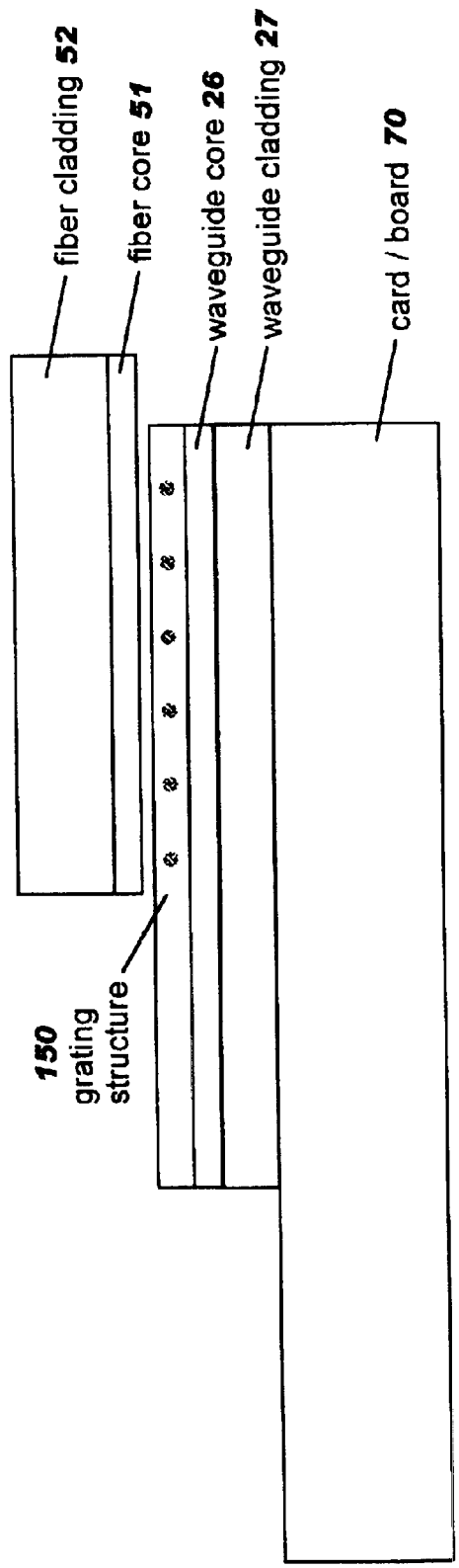
FIG. 6 is a cross section view of an optical coupler including a grating structure.
Figure 7:
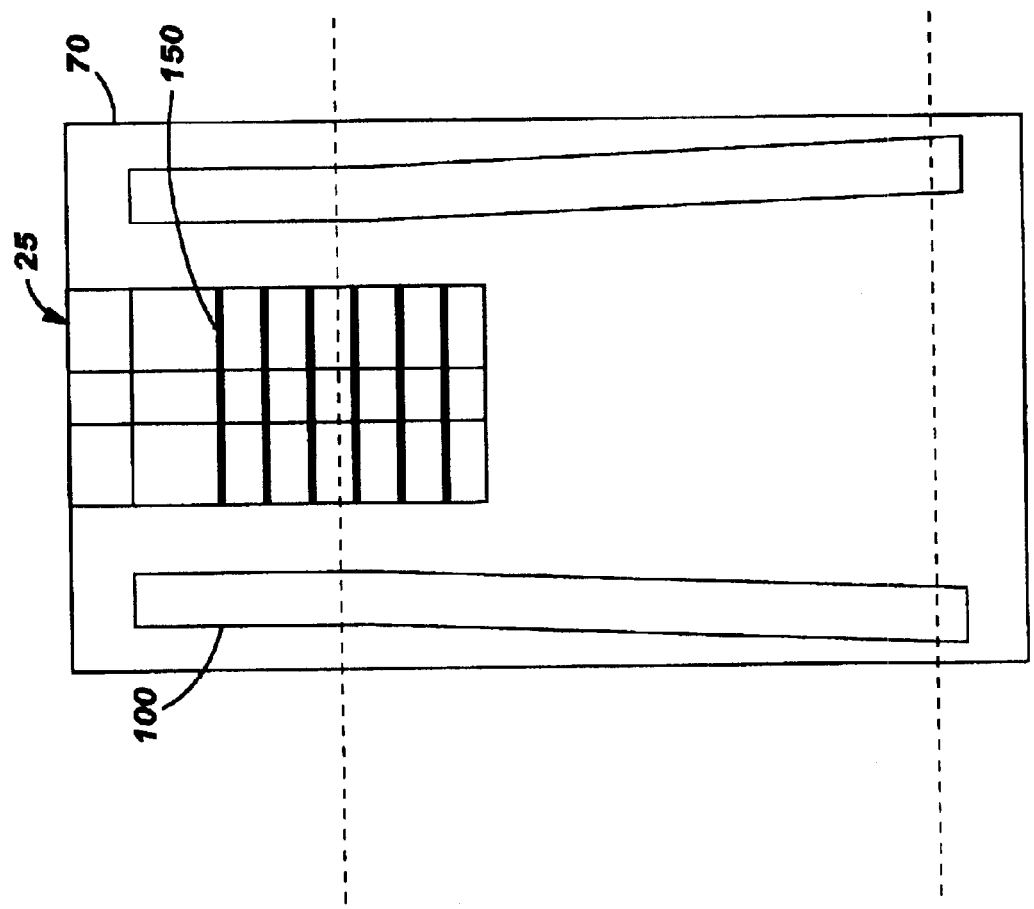
FIG. 7 is a top view of an optical coupler including a grating structure.

Referring to FIG. 6 there is shown a preferred embodiment which consists of a grating structure 150 formed on the second optical waveguide 25. Specifically, the grating structure 150 is formed in the low index of refraction region 27 surrounding the waveguide core 26. A top view of the grating structure 150 is illustrated in FIG. 7. This grating structure 150 is a periodic refractive index perturbation.

In an alternative embodiment (not shown) the grating structure 150 may also be formed in either the waveguide core 26 or fiber-ribbon core 51 and thereby modulating the refractive index of either waveguide core 26 or fiber-ribbon core 51. The grating structure 150 is preferably formed in the low index of refraction region 27 by lithographically defining and physically etching the grating. The grating structure 150 is preferably formed in the waveguide core 26 or fiber-ribbon core 51 by interferometrically writing an index variation into the waveguide or fiber core which is preferably comprised of UV-sensitive material such as Ge-doped silica.

This grating structure 150 may also be formed in a similar arrangement to enhance coupling between the first optical waveguide 20 and the fiber-ribbon 50. In this embodiment the apparatus has a grating structures 150 formed in the low index of refraction region 22 of the first optical waveguides 20 to enable grating-assisted coupling.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. An apparatus for providing a staircase arrangement for the connection of optical waveguides between a card and backplane comprising:
   a card having first optical waveguides, said first optical waveguides having a low index of refraction region surrounding a high index of refraction core region;
   first electrical conductors embedded in said card, said card having a first edge ending in a first staircase arrangement;
   optical fiber-ribbons having a low index of refraction region surrounding a high index of refraction core region and having a first end in close proximity with said first optical waveguides, said optical fiber-ribbons protruding from said first edge;
   a first guidance structure connected to said first edge, said first guidance structure containing channels to guide and align said optical fiber-ribbons and having a first inner side comprising a staircase arrangement and a first outer side having an inclination;
   a backplane having second optical waveguides, said second optical waveguides having a low index of refraction region surrounding a high index of refraction core region;
   second electrical conductors embedded in said backplane, said backplane having a second edge ending in a second staircase arrangement; and
   a second guidance structure connected to said second edge, said second guidance structure having a second inner side comprising a staircase arrangement and a second outer side having an inclination and tapered openings which receive and guide a second end of said optical fiber-ribbons into close proximity with said second optical waveguides when said first outer side of first guidance structure is brought into contact with said second outer side of second guidance structure, thereby forming a staircase arrangement of connected waveguides between a card and backplane.

2. The apparatus of claim 1 wherein said fiber-ribbons have a D-shaped cross section such that said high index of refraction core region is in close proximity to a flat edge of said D-shaped cross section and said flat edge is in close proximity to said first and second optical waveguides.

3. The apparatus of claim 1 wherein said fiber-ribbons are multi-mode high refractive index polymer optical fibers with bend radii of approximately 1 mm.

4. The apparatus of claim 1 wherein said card and said backplane further comprises a third guidance structure to provide fine on card or board alignment between said fiber-ribbons and said first and second optical waveguides.

5. The apparatus of claim 4 wherein said third guidance structure is funnel shaped and is fabricated simultaneously with said optical waveguides.

6. The apparatus of claim 1 wherein said second guidance structure has a V-groove geometry.

7. The apparatus of claim 1 wherein said fiber-ribbons are attached to said first edge by an epoxy.

8. The apparatus of claim 1 wherein said fiber-ribbons are attached to said first edge by fusion splicing.

9. The apparatus of claim 1 further comprising a grating structure formed in said low index of refraction region of said first and second optical waveguides such that said grating structure is in close proximity to said high index of refraction core region of said fiber-ribbons.

10. The apparatus of claim 9 wherein said grating structure is formed in said low index of refraction region of said first and second optical waveguides by lithographically defining and physically etching said grating structure.

11. The apparatus of claim 1 further comprising a grating structure formed in said high index of refraction core region of said first and second optical waveguides such that said grating structure is in close proximity to said high index of refraction core region of said fiber-ribbons.

12. The apparatus of claim 11 wherein said grating structure is formed in said high index of refraction core region of said first and second optical waveguides by interferometrically writing an index variation into said core region.

13. The apparatus of claim 11 wherein said grating structure is formed in said high index of refraction core region of said fiber-ribbons by interferometrically writing an index variation into said core region.

14. The apparatus of claim 11 wherein said waveguide core or fiber-ribbon core is comprised of a UV-sensitive material.

15. The apparatus of claim 14 wherein said UV-sensitive material is Ge-doped silica.

16. The apparatus of claim 1 further comprising a grating structure formed in said high index of refraction core region of said fiber-ribbons such that said grating structure is in close proximity to said first and second optical waveguides.

17. The apparatus of claim 1 wherein said high index of refraction core region of said first and second optical waveguides have a flared geometry to enhance alignment between said waveguide core region and said fiber-ribbons core region.

18. The apparatus of claim 1 wherein said card and said backplane further comprise parallel planar arrays of said first and second optical waveguides.

19. The apparatus of claim 1 wherein said card and said backplane further comprise multiple embedded layers of said first and second optical waveguides and where successive layers of said first and second optical waveguides have increased length to mate with said first and second staircase arrangements.

20. The apparatus of claim 1 wherein the connection of said card and said backplane is an orthogonal connection and said first outer side and said second outer side have an inclination of approximately 45 degrees.

21. A method for forming a connection of optical waveguides between a card and backplane comprising the steps of:

provolving a card having first optical waveguides, said first optical waveguides having a low index of refraction region surrounding a high index of refraction core region;

forming a first edge in said card ending in a first staircase arrangement;

providing fiber-ribbons having a low index of refraction region surrounding a high index of refraction core region and having a first end in close proximity with said first optical waveguides, said fiber-ribbons protruding from said first edge;

connecting a first guidance structure to said first edge, said first guidance structure containing channels to guide and align said fiber-ribbons and having a first inner side comprising a staircase arrangement and a first outer side having an inclination;

providing a backplane having second optical waveguides, said second optical waveguides having a low index of refraction region surrounding a high index of refraction core region;

forming a second edge ending in a second staircase arrangement;

connecting a second guidance structure to said second edge said second guidance structure having a second inner side comprising a staircase arrangement and a second outer side having an inclination and tapered openings;

inserting a second end of said fiber-ribbons into said tapered openings which receive and guide said second end of fiber-ribbons; and placing said first outer side of first guidance structure into contact with said second outer side of second guidance structure thereby placing said fiber-ribbons into close proximity with said second optical waveguides and forming a staircase arrangement of connected waveguides between a card and backplane.

22. The method of claim 21 wherein said fiber-ribbons have a D-shaped cross section such that said high index of refraction core region is in close proximity to a flat edge of said D-shaped cross section and said flat edge is in close proximity to said first and second optical waveguides and said backplane further comprises a guidance structure to provide alignment between said fiber-ribbons and said second optical waveguides.

23. The method of claim 21 further comprising the steps of forming a grating structure in said low index of refraction region of said first and second optical waveguides such that said grating structure is in close proximity to said high index of refraction core region of said fiber-ribbons.

24. The method of claim 21 further comprising the steps of forming a grating structure in said high index of refraction core region of said first and second optical waveguides such that said grating structure is in close proximity to said high index of refraction core region of said fiber-ribbons.

25. The method of claim 21 further comprising the steps of forming a grating structure in said high index of refraction core region of said fiber-ribbons such that said grating structure is in close proximity to said first and second optical waveguides.

26. The method of claim 21 wherein the connection of said card and said backplane is an orthogonal connection and said first outer side and said second outer side have an inclination of approximately 45 degrees.

* * * * *